Patented June 22, 1926.

1,589,531

UNITED STATES PATENT OFFICE.

WILLIAM H. HOODLESS, OF PHILADELPHIA, PENNSYLVANIA.

PROCESS OF MAKING FILTERING MATERIAL.

No Drawing.   Application filed March 10, 1921. Serial No. 451,346.

Kieselguhr, sometimes termed diatomite, is a silicious, highly porous earth, used very largely for filtering. Its decolorizing properties are not considered to be remarkable with most of the liquids that require to be filtered, but its filtering properties, especially in removing minute organic impurities are deemed unexcelled. Many kinds of solutions are more satisfactorily filtered through it than through any other material.

Kieselguhr that has intimately mixed with it a very finely divided carbon derived directly from the destructive distillation, in the body of the kieselguhr, of a cellulose material is, however, capable of very active de-colorizing action, especially when the entire interior structure of the kieselguhr is lined by carbon that is highly but very minutely porous. This carbon is intimately and preferably indistinguishably mixed with the kieselguhr.

Old rags, linen or cotton (which, when contained in waste from sugar processes, are technically termed bagacillo) and various vegetable materials can be used instead of sawdust. Such materials should be finely macerated. If this mixture of kieselguhr and organic material be wet, it should be dried until the sensible moisture is evaporated. The process will then begin.

My process of producing such a composition of matter in the best way of which I am at present aware is by the destructive distillation of sawdust, in a closed vessel, mixed with the kieselguhr in intimate mixture. The heat applied is sufficient to disassociate the organic molecules of the sawdust, and to cause to pass off as gases, either isolated or in combination with each other, or with other materials, the elements that had been united to the carbon atoms to form the organic compound above mentioned. This distillation is preferably complete, and is carried to a point where the volatile products of the distillation are no longer produced.

In practice, I find the best way of carrying out my process is as follows:—

A dry and intimate mixture of kieselguhr and sawdust is placed in a retort, which is closed except a small vapor outlet port and the temperature is raised to a distilling heat. This confines the soot and smoke arising from the sawdust and makes it most thoroughly to permeate the kieselguhr. The distilling heat is indicated by the passage off through the vapor outlet port of a gas that burns in the air, at the outlet. The appearance and the exhaustion of this gas seems to give a very simple and satisfactory test of the successful carrying out of the process. The heat may be increased until the gas appears in reasonable volume. It may then be lighted, and the continuation of the flame will indicate that the distillation is still incomplete. The disappearance of the flame provided that the temperature of the mass in the retort has not been lowered, will indicate the completion of the distillation. Of course, the temperature of the mass in the retort, and not the exteriorly applied heat is the deciding factor. The material is then removed from the retort and if, as it generally does, it contains metallic salts, these must be removed in a suitable manner. A dilute hydrochloric acid will serve in many cases to do this, but there are many other methods of freeing the mass from these impurities and in many cases there are not any of these impurities present, and sometimes they need not be removed.

The product of this process has very great filtering and decolorizing properties. It will remove the minute organic impurities from solutions as readily as the commercial kieselguhr and in addition has a decolorizing power greater than char. It can be revived readily when spent, and is improved rather than injured for most purposes by so doing, certainly when the reviving is not too frequently repeated.

I claim—

1. The process of producing kieselguhr the internal structure of which is lined throughout with finely divided de-colorizing carbon in the form of a thin film which comprises making an intimate mixture of dry kieselguhr and dry sawdust confining this dry mixture in a retort closed except for a small opening, heating this mixture so confined until a combustible vapour is generated and passes off through the opening and continuing this heating with the maintainance of the same temperature and the generation of the vapour until the vapour is no longer given off.

2. The process of producing a decolorizing kieselguhr, which consists in destructively distilling with kieselguhr, in a report without access of air, vegetable material in a solid state and composed largely of cellulose, thereby producing in the interior of the pores of the kieselguhr particles a thin layer of decolorizing carbon.

3. The process as described in claim 2 with the following additional step, namely:—removing the kieselguhr from the retort and cooling it and removing the mineral salts therefrom by treatment with hydrochloric acid.

In testimony whereof I affix my signature.

WILLIAM H. HOODLESS.